United States Patent

[11] 3,612,564

| [72] | Inventor | Dennis G. Harvey<br>Ancaster, Ontario, Canada |
|------|----------|-----------------------------------------------|
| [21] | Appl. No. | 3,371 |
| [22] | Filed | Jan. 16, 1970 |
| [45] | Patented | Oct. 12, 1971 |
| [73] | Assignee | Allis-Chalmers Manufacturing Company<br>Milwaukee, Wis. |

| [54] | LIFT LINKAGE FOR WALKIE LIFT TRUCK<br>4 Claims, 7 Drawing Figs. |
|------|-----|
| [52] | U.S. Cl. ................................................ 280/43.12 |
| [51] | Int. Cl. ............................................... B62d 21/18 |
| [50] | Field of Search ...................................... 280/43.12,<br>43; 214/512; 280/34, 35 |

[56] References Cited
UNITED STATES PATENTS

| 3,392,858 | 7/1968 | Fernstrom et al............. | 280/43.12 |
| 3,421,775 | 1/1969 | Dugelay ........................ | 280/43.12 |

Primary Examiner—Benjamin Hersh
Assistant Examiner—Robert R. Song
Attorneys—Charles L. Schwab, Robert B. Benson and Kenneth C. McKivett ABSTRACT: A lift linkage is provided for a low lift truck in which a pair of levers for operating the push-pull rods have extensions releasably secured thereto. The extensions are connectable to the levers in one of two laterally spaced mounting positions, thus permitting alternate attachment to load support attachments having wheel operating rods of different lateral spacing.

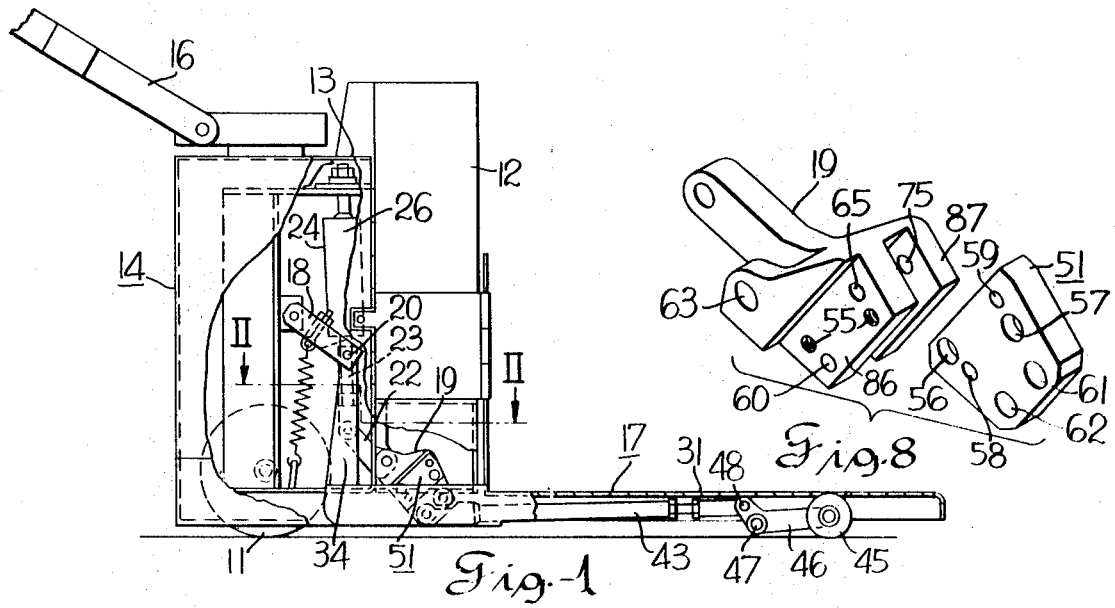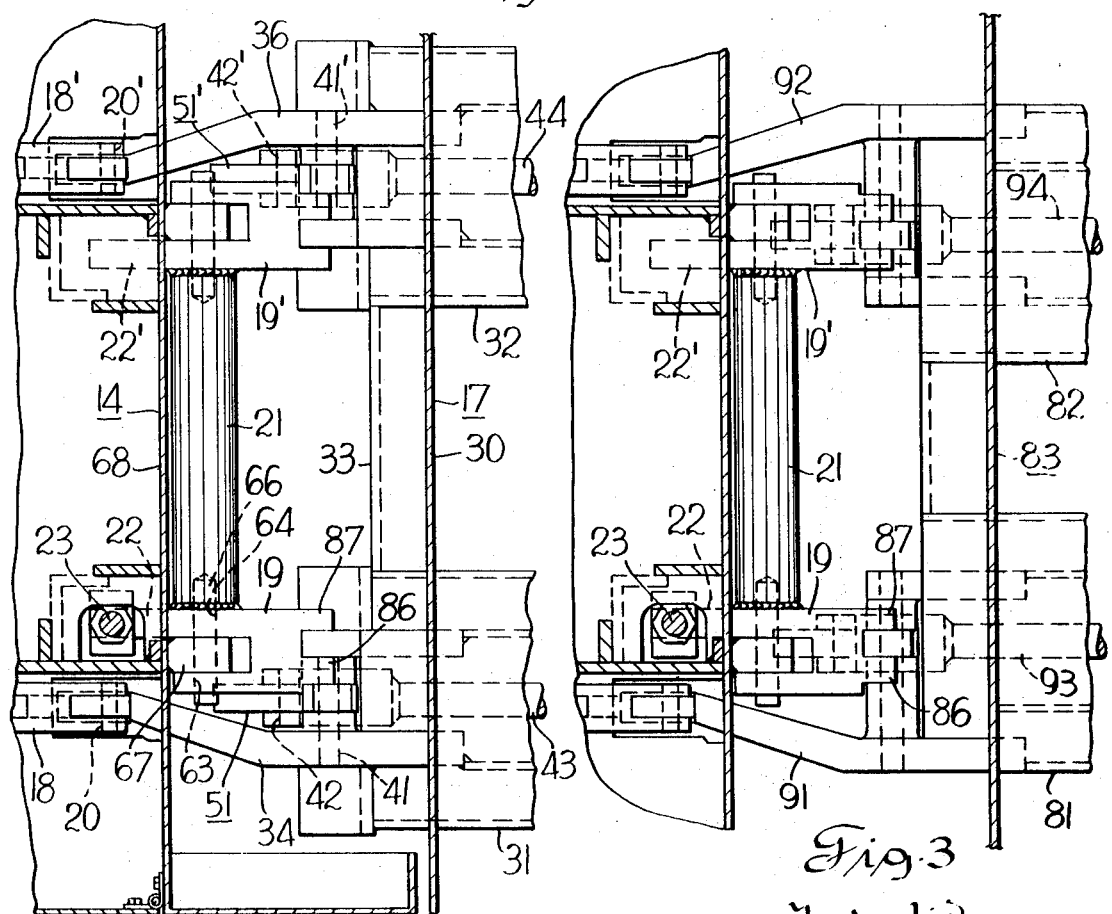

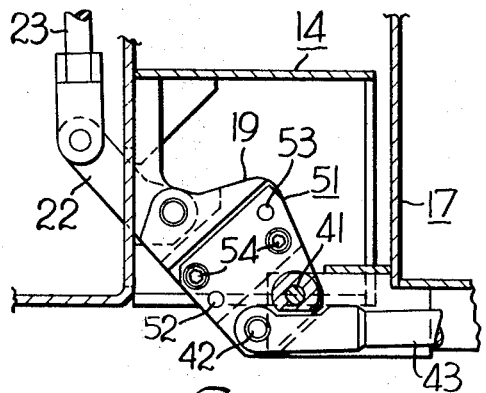
Fig.4
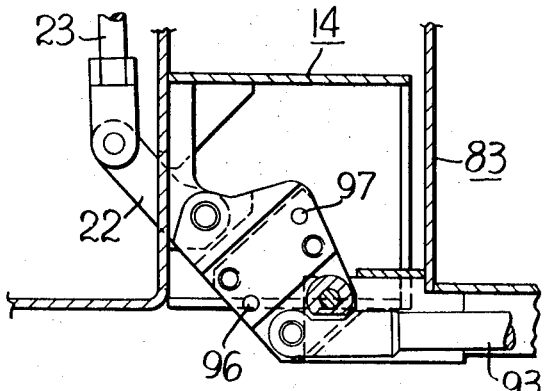
Fig.6
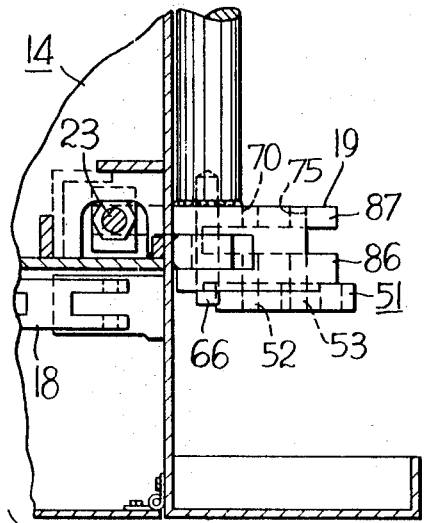
Fig.5
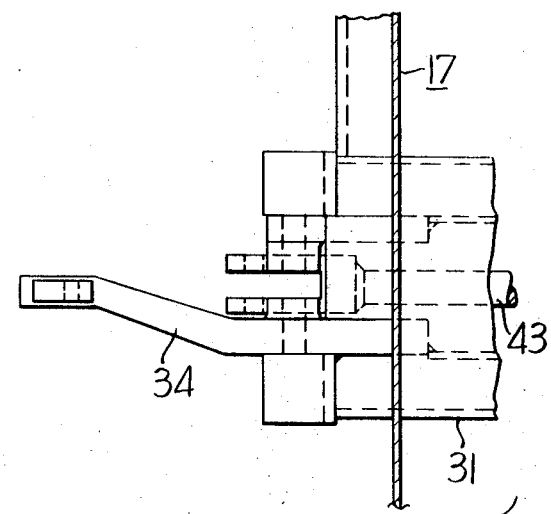
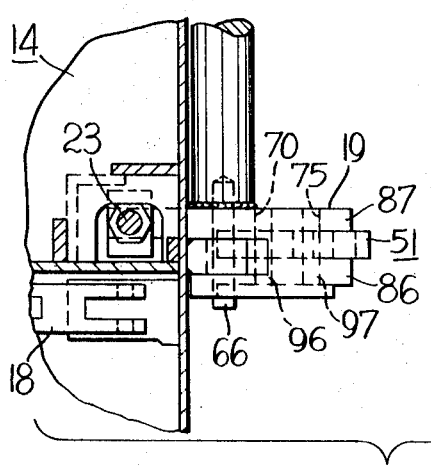
Fig.7

LIFT LINKAGE FOR WALKIE LIFT TRUCK

This invention relates to an improved lift linkage for a low lift truck and particularly to the provision of special connecting means to permit fork attachments with different width forks to be installed on the lift truck. The low lift truck, which is often referred to as a "walkie" truck, employs a pair of rod operated wheels beneath the load platform or forks which are operated through power means, such as a hydraulic ram, and a suitable linkage. Various connections have heretofore been employed between the load support platform or forks and the frame of the truck including a parallel linkage actuated by a hydraulic ram.

In the present invention the links for operating the push-pull rods for the support wheels are constructed in two parts in such a manner that the load support attachment can be interchanged with other load support attachments of different width. This is achieved by connecting the extension part to the link at different laterally spaced positions.

It is a primary object of this invention to provide an improved wheel operating linkage for a low lift-type lift truck.

It is a further object of this invention to provide a two part lever in a linkage for a low lift truck wherein the part attached to the push-pull rod for operating the support wheels can be selectively attached to one of two laterally spaced positions on the rod operating lever.

It is a further object of this invention to provide an improved low lift truck wherein different widths of attachments can be secured to the power unit with a minimum of effort.

It is a further object of this invention to provide a lift linkage for a low lift truck wherein the actuating levers for the push-pull rods have extensions which may be interconnected in two different relative positions on the levers to easily permit interchange of attachments with different lateral spacing of the push-pull rods.

These and other objects of the present invention will be apparent to those familiar with the art to which the invention pertains when the following description is read in conjunction with the drawings in which:

FIG. 1 is a side elevation of a low lift truck in which the present invention is incorporated with parts removed for illustration purposes;

FIG. 2 is a section view taken along the line II—II in FIG. 1 in showing an attachment with a pair of widely spaced works;

FIG. 3 is a view similar to FIG. 2, but showing an alternate attachment with a pair of closely spaced forks;

FIG. 4 is an enlarged side view of the portion of the lift linkage to which the present invention pertains;

FIG. 5 is the view similar to FIG. 2, but with the fork attachment separated from the frame of the truck for purposes of illustration;

FIG. 6 is a side view similar to FIG. 4, but showing the attachment of FIG. 3; and FIG. 7 is a view similar to FIG. 5, but showing the attachment with closely spaced forks removed from the frame of the lift truck for purposes of illustration.

Referring to FIGS. 1, 2 and 8, the lift truck includes a drive wheel 11 which is driven by an electric motor not shown supplied with power by a battery 12 supported on the rear part of the frame 13 of the power unit 14. The wheel 11 is pivoted on a vertical axis by means, not shown, and is steered by an operator through a control handle 16. A load support structure 17 is secured to the frame 13 of the power unit by a parallel linkage including upper links 18, 18' and rod operating levers 19, 19'. The levers 19, 19' are rigidly interconnected by a cylindrical bar 21 welded to the main parts 22, 22' of levers 19, 19'. The forwardly extending part of lever 19 is pivotally connected to the lower end of the piston rod component 23 of a hydraulic jack 24 and the cylinder portion 26 of the hydraulic jack 24 is connected in a suitable manner to the frame 13 such as through a ball and socket joint, not shown. The load support structure 17 includes a pair of rearwardly extending pallet forks 31, 32 which are interconnected by a vertical wall 30 and brace member 33. A pair of L-shaped upright arms 34, 34' are rigidly connected, as by welding, to the forks 31, 32 and have their upper ends pivotally connected to the rear ends of links 18, 18' by pins 20, 20' on a common transverse axis.

Referring also to FIG. 4, the rear end of lever 19 is pivotally connected by a pin 41 on a transverse axis to the load support structure 17 and is also pivotally connected to a longitudinally shiftable push-pull rod 43 on another transverse axis by a pin 42. In like fashion the lever 19' is pivotally connected to the load support structure 17 and to the push rod 44 by pins 41', 42', shown in FIG. 2. Push rod 43 is pivotally connected at its rear end by a pin 48 to an arm 46 which in turn is pivotally connected by pin 47 to fork 31. A support wheel 45 is rotatably mounted on the free end of arm 46. A similar arm and wheel are supported on fork 32 and are operated by push-pull rod 44, shown in FIG. 2.

As illustrated in FIGS. 4 and 8, link 19 has separable extension member 51 which is fixedly secured to the main part 22 of the lever 19 by a pair of roll pins 52, 53 and by a pair of cap screws 54 which have Allen wrench sockets in their heads as shown in FIG. 4. The extension member 51 has a pair of stepped diameter bores 56, 57 into which the heads of cap screws 54 fit, the latter threadingly engaging drilled and taped bores 55 in flange 86 of lever 19.

The cap screws function mainly to releasably secure the extension member 51 to the lever 19 and a pair of roll pins 52, 53 fitting in aligned bores 58, 60 and 59, 65 in extension member 51 and flange 86 rigidly secure the extension member 51 so that when assembled they function as a single part.

Bores 61, 62 are provided for receiving the pins 41, 42, respectively by which the lever 19 connects to fork structure 17 and to push-pull rod 43. As shown in FIGS. 2 and 8, link 19 is provided with aligned bores 63, 64 for receiving a pin 66 by which the lever 19 is pivotally connected on a transverse axis to a pivot lug 67 welded to a vertical plate 68 of the frame 14. Lever 19' and its extension member 51' are basically reverse images of lever 19 and its extension member 51.

The fork attachment illustrated in FIGS. 1, 2, 4 and 5 has forwardly extending forks 31, 32 which are more widely spaced than the forks 81, 82 of the load support attachment 83 shown in FIGS. 3, 6 and 7. These two load support attachments 17 and 83 are interchangeably connectable with the frame 14 through their connection to links 18, 18' and levers 19, 19'.

The arms 91, 92 of attachment 83 have the same lateral spacing as arms 34, 36 of attachment 17 thus interchangeably connecting to links 18, 18'. However, the spacing of rods 93, 94 of attachment 83 is less than the spacing of rods 43, 44 of attachment 17, thus requiring different connecting points to links 19, 19'.

This problem is solved by connecting the extension members 51, 51' to the main parts 22, 22' of the levers 19, 19' at laterally inward positions. As shown in FIG. 8, lever 19 has two laterally spaced flanges 86, 87. Its extension member 51 may be secured to the laterally outer side as shown in FIGS. 1, 2, 4 and 5 by roll pins 52, 53 and cap screws 54 or the extension member may be placed on the laterally inner side of flange 86, between flanges 86 and 87, and secured by roll pins 96, 97 in which position it aligns for connection with push-pull rod 93. The roll pins fit in bores 60, 65 of flange 86, bores 58, 59 of extension member 51 and bores 70, 75 in flange 87.

The forks 81, 82 of FIGS. 3 and 7, are, for instance, approximately four inches closer to one another than those illustrated in FIGS. 2 and 5. These two positions of connection of extension member 51 are clearly illustrated in FIGS. 5 and 7 in which the wide spaced fork attachment 17 and the close spaced fork attachment 83 are shown separated from the power unit 14. From the foregoing description it will be appreciated that applicant has provided a means for conveniently securing various attachments to a power unit of a lift truck by use of a two piece, releasably interconnectable lever which is a part of a parallel connecting and lift linkage between the power unit and the attachment as well as a push rod operating lever for the attachment support wheel. This invention is particularly useful in permitting alternate attachment of load support structures having forks of different spacing.

The embodiments of the invention in which an exclusive property or privilege is claimed are defined as follows:

1. In the lift linkage for a lift truck of the type having a frame and a load carrying structure supported at least in part by wheels on arms pivoted on such structure for vertical swinging movement in response to longitudinal movement of rods pivotally connected to the arms, the combination comprising:

a lever structure including a pair of rigidly interconnected levers pivotally mounted on said frame on a first transverse axis and presenting connecting portions;

a pair of extension members pivotally connected to said rods, respectively, on a second transverse axis and pivotally connected to said load carrying structure on a third transverse axis spaced from said second axis, said extension members presenting connection portions permitting connection to said connecting portions of said levers, respectively, in either one of two laterally spaced positions; and releasable fastening means fixedly securing said extension members to said levers, respectively, for swinging movement therewith.

2. The invention of claim 1 wherein an upstanding hydraulic ram is connected at one end to said frame and its other end to said lever structure at a point spaced from said first axis.

3. The invention of claim 1 and further comprising a pair of links interconnecting opposite lateral sides of said load carrying structure to said frame, said links and levers constituting a parallel linkage.

4. The invention of claim 1 wherein each of said connecting portions of said levers presents a pair of laterally spaced flanges to which said connecting portions of said extension members are selectively secured to achieve different lateral spacing of said extension members.